US007146339B2

(12) United States Patent
Iwamura

(10) Patent No.: US 7,146,339 B2
(45) Date of Patent: Dec. 5, 2006

(54) MULTIPLEXING USER INFORMATION TO AN OUTPUT IMAGE

(75) Inventor: Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 780 days.

(21) Appl. No.: 09/781,332

(22) Filed: Feb. 13, 2001

(65) Prior Publication Data

US 2001/0032186 A1 Oct. 18, 2001

(30) Foreign Application Priority Data

Feb. 14, 2000 (JP) ............................. 2000-035300

(51) Int. Cl.
*G06F 99/00* (2006.01)
(52) U.S. Cl. .................. 705/54; 384/14.01; 384/14.08; 382/100; 713/176; 713/191
(58) Field of Classification Search .................. 705/54; 713/201, 176; 717/178; 348/14.01
See application file for complete search history.

(56) References Cited

U.S. PATENT DOCUMENTS

| 4,926,325 | A | * | 5/1990 | Benton et al. ................. 705/39 |
| 5,903,721 | A | * | 5/1999 | Sixtus ......................... 713/201 |
| 5,950,010 | A | * | 9/1999 | Hesse et al. ................. 717/178 |
| 6,182,218 | B1 | * | 1/2001 | Saito ............................ 713/176 |
| 6,513,118 | B1 | | 1/2003 | Iwamura ..................... 713/176 |
| 2002/0054356 | A1 | * | 5/2002 | Kurita et al. ............... 358/3.28 |
| 2003/0128861 | A1 | * | 7/2003 | Rhoads ........................ 382/100 |
| 2004/0169723 | A1 | * | 9/2004 | Kawasaki et al. ........ 348/14.01 |
| 2004/0172646 | A1 | * | 9/2004 | McIntyre et al. ............... 725/1 |

OTHER PUBLICATIONS

U.S. Appl. No. 09/239,017, filed Jan. 29, 1999.
W. Niblack, et al., "Storage and Retrieval for Image and Video Databases III", Proceedings, The International Society for Optical Engineering, San Jose, California, Feb. 9-10, 1995. vol. 2420, pp. 164-173.
H. Inoue, et al., "A Digital Watermark Based on the Wavelet Transform and its Robustness on Image Compression", IEEE 1998, pp. 391-395.
T. Nakamura, et al., A Method of Watermarking under Frequency Domain for Protecting Copyright of Digital Image, SCIS'97-26A.
J. Ohnishi, et al., "A watermarking scheme to image data by PN sequence", SCIS'97-26B.
H. Ishizuka, et al., "On an experimental evaluation of steganography with wavelet transform", SCI'S 97-26D.

* cited by examiner

*Primary Examiner*—Firmin Backer
(74) *Attorney, Agent, or Firm*—Fitzpatrick, Cella, Harper & Scinto

(57) ABSTRACT

An image processing apparatus which stores user information related to a seller or a buyer of the image processing apparatus. The user information is thereafter multiplexed to an output image formed by the image processing apparatus. If the output image were an unlawful image, the seller or the buyer could be identified from the user information multiplexed in the output image.

60 Claims, 3 Drawing Sheets

MULTIPLEXING USER INFORMATION TO AN OUTPUT IMAGE

BACKGROUND OF THE INVENTION

1. Field of the Invention

This invention relates to an image processing apparatus, an image processing method, electronic commerce system, electronic commerce method and a computer program product, and especially relates to a technology for prohibiting counterfeiting of a bill or an image by attaching additional information in digital image data to be printed. The invention further relates to how to use user information obtained in sales over electronic commerce of an article of commerce by using network.

2. Description of the Related Art

Conventionally, an image processing apparatus scans an original image and records the original image faithfully on a paper or an electrical recording medium. Meanwhile, it is possible to reproduce an image to be printed faithfully on paper by recent image processing technology in accordance with the progress of color process technology. With this technology, an image processing apparatus can copy and print forgeries of objects, like bills or valuable securities, for abuse or mischief.

For a solution of the above-mentioned problem, it is proposed to multiplex information of a name of maker or an image processing apparatus or a manufacture number of an image processing apparatus to image data to be printed by the image processing apparatus and to identify the image processing apparatus by using the multiplexed information.

The proposed method using the multiplexed information is preferable when applied to a comparatively expensive image processing apparatus, like a color copying apparatus. However, it is not so preferable when applied to an inexpensive image processing apparatus, like a color printer being popular recently. Since the expensive image processing apparatus is thrown out rarely and information of an owner of the expensive image processing apparatus is surely retained for after-purchase servicing, it is possible to specify an owner of the expensive image processing apparatus used in a forgery as significant evidence in case that a manufacture number of the expensive image processing apparatus is detected from a counterfeited bill or valuable security.

On the other hand, an inexpensive image processing apparatus is easy to throw out. So a forger is likely to conceal his efforts by throwing out an inexpensive image processing apparatus and destroy evidence when a manufacture number of the forger's image processing apparatus is specified.

SUMMARY OF THE INVENTION

An object of the present invention is to provide solutions for the above problems.

Another object of this invention is to decrease the likelihood that an image processing apparatus is used to make unauthorized images by setting information to specify a seller or a buyer of the image processing apparatus inside it. As a result, if the output image were an unlawful image, the seller or the buyer could be specified from the user information multiplexed the output image.

One particular object of the present invention is to provide an image processing apparatus which has user information storing means for storing user information related to a seller or a buyer of the image processing apparatus; and multiplexing means for multiplexing the user information to an output image formed by the image processing apparatus.

Another object of the present invention is to provide an electronic commerce system which performs through a network system connecting one terminal with another terminal through a network, the electronic commerce system comprising information setting means for setting information related to a seller or a buyer obtained through the network, and multiplexing means for multiplexing said information set by the information setting means to information of an output image.

Another object of the present invention is to provide a computer program product, comprising a computer readable medium having computer program codes for executing image processing on an image processing apparatus, said product including: user information storing procedure codes for storing user information related to a seller or a buyer of the image processing apparatus; and multiplexing procedure codes for multiplexing the user information to a output image.

Another object of the present invention is to provide a computer program product, comprising a computer readable medium having computer program codes for an electronic commerce system which performs through a network system connecting one terminal with another terminal through a network, the computer program product comprising information setting procedure codes for setting information related to a seller or a buyer obtained through the network, and multiplexing procedure codes for multiplexing said information set by the information setting means to information of an article for sale.

It is an important advantage of the present invention that the present invention can offer information related to a seller or a buyer and an article for sale. So if the article were used unlawful, it would be easy to specify the seller or the buyer.

Still another object of the present invention is to provide an image processing apparatus and an electronic commerce system and a computer program product that have a new function not known before.

The foregoing and still other objects, features and advantages of the present invention will become fully apparent from the following description to be taken in conjunction with the attached drawings.

DESCRIPTION OF THE PREFERRED EMBODIMENTS

[First embodiment]

Recently, electronic commerce (Web-based commerce) to deal with an article for sale on a network is widely used in accordance with development of a network, like the Internet. A procedure of the electronic commerce is the following. A virtual mall is opened on the network, an article for sale like a printer is exhibited on the virtual mall, a user makes a contract for purchasing an article selected by the user, the article selected by the user is delivered, and cost of the article selected by the user is paid by a credit card.

Figure 1:
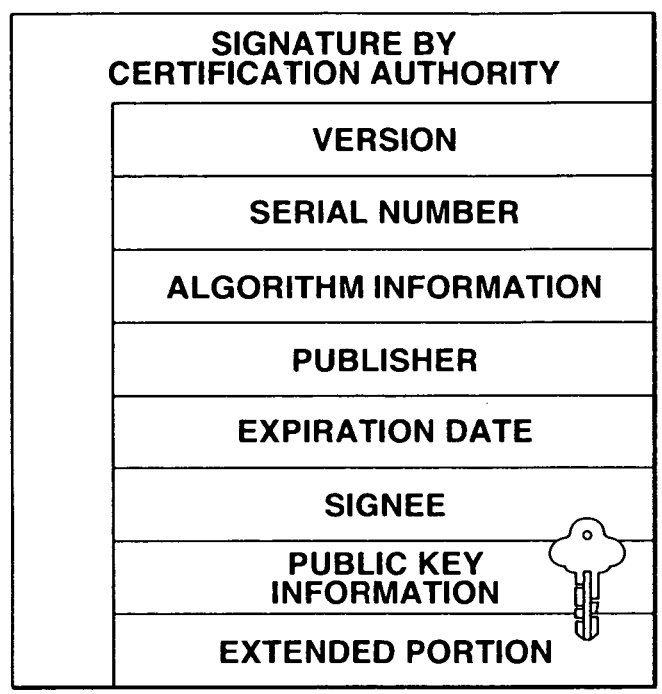
FIG. 1 is a block diagram which shows a public key certification.

Along with the popularization of the electronic commerce, Public Cryptograph Technology (cf. "modern cryptograph theory" Institute of Electronics, Information and Communication Engineers) was proposed to certify a seller and a buyer and to prevent failure of performance after a contract was done. Infrastructure using the public key is called PKI (Public Key Infrastructure) and standardization using X.509 public key certification (see FIG. 1) is founding in IETF (Internet Engineering Task Force: International Organization for Standardization).

Public key certification is data which contains an identification name (name to specify each person) published from a trusted third-party body called a "Certification Authority" and each person's public key is signed by a Certification Authority. It is possible to prohibit altering content of the public key by Certification Authority's signature and a user received the public key certification can verify that the public key contained in the public key certification is owned a person of an identification name of the public key certification under Certification Authority's guarantee. In short, PKI (Public Key Infrastructure) provides a mechanism to bind a person (or a server etc.) to his or her public key with certainty. It is frequently used in an electronic credit system, to certify a seller and a buyer.

The following is an example of a method which decreases the likelihood of counterfeiting bills or valuable securities by using above-mentioned electronic commerce.

Figure 2:
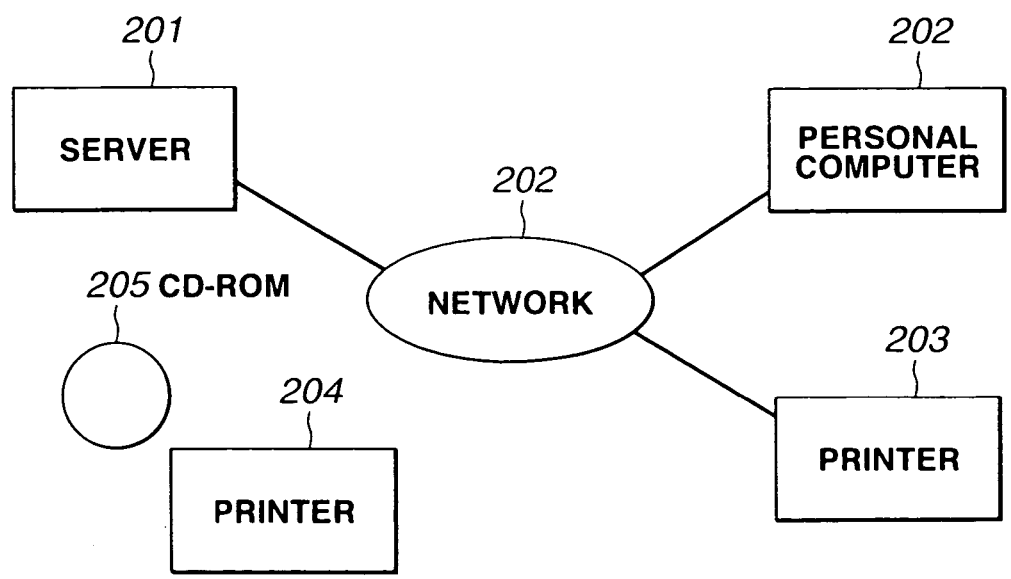
FIG. 2 is an outline of a system of the $1^{st}$ and the $2^{nd}$ embodiment of the present invention.

FIG. 2 is a block diagram which shows an example of such a system, applying this invention for an image processing apparatus, to prevent counterfeiting. Reference numeral 200, in FIG. 2, is a network to connect a seller with a buyer, server 201 is a seller's server operating a virtual mall etc., personal computer 202 is a personal computer for a buyer to purchase an article for sale, printer 203 is a printer which has already been purchased by using electronic commerce, printer 204 is a printer sold over the counter sale, CD-ROM 205 is a recording medium storing a driver and attached printer 203, 204.

Figure 3:
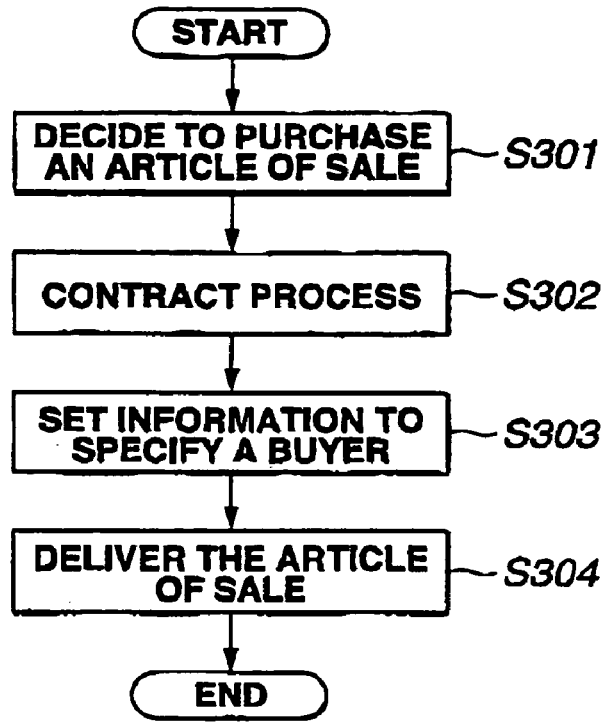
FIG. 3 is a flow chart that shows an operation of the $1^{st}$ embodiment of the present invention.

FIG. 3 indicates an example of a processing for purchasing an article for sale.

When an owner (buyer) of personal computer 202 decides to purchase an article of sale sold in a virtual mall having server 201 (step 301), a contract process, which is agreement about purchase including, for example, a method of payment, a method of transportation, and conditions of use, is made through network 200 (step 302). In case the buyer makes use of the above-mentioned electronic credit system like electronic money for payment, the public key certification can be used as important information to specify the buyer. In case the buyer makes use of a method of transferring money from the buyer's account to the seller's account or a credit card for payment, the buyer's account number or information of the credit card can be used as important information to specify the buyer. The buyer inputs such information (the public key certification, the account number or information of the credit card) by personal computer 202 when the buyer makes his contract. In this embodiment, since the article for sale is an image processing apparatus like a printer which can be used counterfeiting bills or valuable securities, the seller having server 201 sets the information to specify the buyer to a specific portion of the image processing apparatus before the seller delivers it to the buyer (step 303).

Then the seller delivers the image processing apparatus (step 304).

The specific portion of the image processing apparatus may be hardware like ROM (Read Only Memory) or a part of software like a printer driver. It is important that the image processing apparatus is set with the information (the public key certification, the account number or information of the credit card) to specify the buyer instead of a manufacture number of the image processing apparatus, and the information to specify the buyer is multiplexed in a print image when the print image is output by the image processing apparatus.

In case a forgery of a bill or valuable security is found later, and even if the image processing apparatus which printed the forgery has been thrown out, it is possible to identify an unlawful owner by using the information to specify the buyer multiplexed to the forgery. The public key certification, the account number or information of the credit card is better than the manufacture number of an image processing apparatus, since it is necessary to confirm personal information for obtaining the public key certification, the account number or information of the credit card.

The seller having server 201 or a bureau of administrative services managing articles for sale manages the information (the public key certification, the account number or the information of the credit card) by using a database instead of multiplexing the information to specify the buyer to a print image directly and an image processing apparatus may be set with information to access the information to specify the buyer on the database. In this case, it is possible for the seller or the bureau of administrative services to get the information to specify buyer on the database from the information to access the data. Under these circumstances, the information to specify the buyer in step 302 changes to the information to access the data on the database.

When it is impossible to set the information of a buyer to an image processing apparatus in light of privacy protection, it is effective to set information related to sale like seller or date of sale to the image processing apparatus for preventing forgery of bills or valuable securities. Then, the information to specify the buyer in step 302 changes to the information related to sale or date of sale.

[Second embodiment]

Whereas an article of sale is purchased by using electronic commerce in a first embodiment, in this embodiment, setting information to specify a user for prohibiting counterfeiting bills or valuable securities is performed for an article having purchased or an article purchased over the counter sale.

The structure of this embodiment's system looks like FIG. 2. Printer 203 is a printer that has already purchased, printer 204 is a printer sold over the counter sale, CD-ROM 205 is a recording medium storing a driver and attached printer 203, 204.

Figure 4:
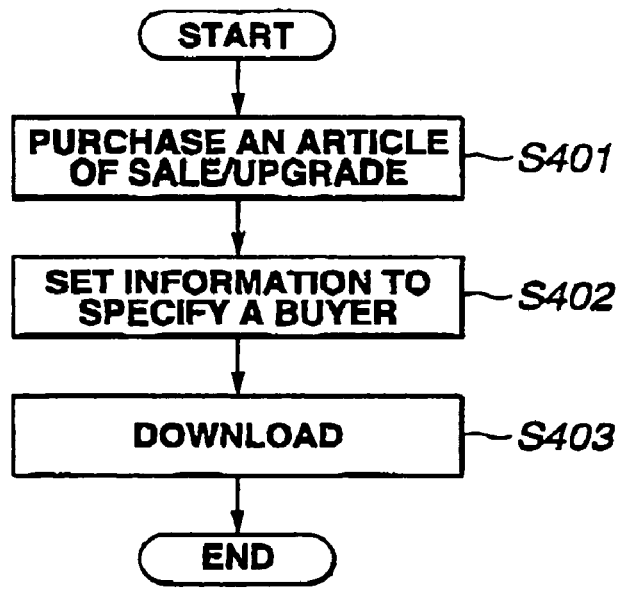
FIG. 4 is a flow chart that shows an operation of the $2^{nd}$ embodiment of the present invention.

FIG. 4 indicates an example of a process for an article purchased not using a network.

At first, the following is an example of a process for an article that has already been purchased.

Upgrade process of a driver by a printer is usually performed several times by download through a network like Internet. A manufacturer informs users of notice of upgrade by a direct mail, an e-mail or home page through a network. When a user of personal computer 202 upgrades a driver (step 401), the user designates a predetermined process and the driver is downloaded from server 201 (step 403). The download is performed after inputting information to specify the user of printer 204 from personal computer 202. It goes without saying that the information is utilized for multiplexing like that of the first embodiment.

The next case is a process for a printer sold over the counter sale (printer 204). CD-ROM 205 attached to printer 204 has recorded on it, at least, information of a store selling printer 204. When a user of printer 204 installs a driver by using CD-ROM 205, the information of a store is set to a specific portion of printer 204. It goes without saying that the information is utilized for multiplexing like that of the first embodiment.

When a user of printer 204 installs a driver by using CD-ROM 205, personal computer 202 may connect to server 201 automatically under controlled a program of CD-ROM 205 and personal computer 202 instead of installing the printer driver from CD-ROM 205. Then information to specify the user of printer 204 is input by the user. Personal computer 202 downloads the last printer driver and an optional function (program) from server 201 in accordance with the input by the user (step 403). The input information is set to a specific portion of printer 204 or the printer driver downloaded from server 201 under control of the program of CD-ROM 205 and personal computer 202. The specific portion of printer 204 may be hardware like ROM (Read Only Memory).

Printer 204 can multiplex the information to specify the user of printer 204 to an output image, like that of the first embodiment, under the above-mentioned procedure. As a result, when a forgery is found, it is possible to identify the forger with certainty based on detecting the information multiplexed to the forgery.

In case a user of server 201 manages users of articles by using a database, the information multiplexed to the forgery is preferable to information to access the data on the database. If a user does not download any data from server 210, stored information prerecorded on CD-ROM 205 is substituting for the information to specify user.

[Third embodiment]

One well-known multiplexing method is a so-called digital watermark, and a digital watermark is used in the following to function as a multiplexing method for the information to specify a user in the first and second embodiment.

Digital watermark technology is a technology that adds copyright information or user information or various identification numbers in an image by converting pixel value of digital data of the image in secret. It is almost impossible to distinguish an original from an image having an added the digital watermark with the naked eye. However, the hidden copyright information etc. as the digital watermark can be displayed by using software to detect the digital watermark. It is possible to obtain the copyright information or the user information or identification numbers by detecting this digital watermark from image data and to identify an illegal copy. First, added information by digital watermark must be non-visible, in other words the information must be added without degradation of an original. Second, the information must keep on remaining in an original, in other words the information must not be lost by a retouch or an attack like a data compressing process, a filter process etc. Third, an amount of added information must be able to be variable. As stated above, digital watermarks need quality, tolerance and flexible amount of information.

The following method is known as a method for adding digital watermark. A method of adding digital watermark can be roughly categorized by two methods: adding information in a spatial area, and a frequency area for a multi-valued still image.

For example, "Techniques for Data Hiding", Proceeding of The SPIE, San Jose Calif., USA, (IBM) W. Bender, D. Gruhl, N. Morimoto, February 1995, and U.S. Pat. No. 5,636,292 are examples of methods adding information in a spatial area.

The following gives a few examples which are methods adding information in a frequency area. A method using "Discrete Cosine Transform" is a digital watermark method in a frequency area for protecting copyright of a digital image (NTT) Nakamura, Ogawa, Takashima, SCIS '97-26A, January 1997. A method using "Discrete Fourier Transform" is a watermark signature method for an image by using PN series (National Defense Academy) Ohonishi, Okla., Matui, SCIS '97-26B, January 1997. Methods using "Wavelet Transform" are experimental considerations related to safety and reliability of digital watermark technology using wavelet transform (Mitsubish, Kyushu university) Ishizuka, Ishi, Sakurai, SCIS '972d, January 1997 and digital watermark image compression based on wavelet transform, about robustness for the conversion process (Matushita) Inoue, Myazaki, Yamamoto, Katura, SCIS '98-32A, January 1998.

Generally speaking, a method adding information in a spatial area is low degradation and low tolerance and a method adding information in a frequency area is comparatively high degradation and high tolerance. It is possible to select a preferable method for each case.

[Fourth embodiment]

The above-mentioned process is not only useful for the image processing apparatus but also general commodities. In other words, it is effective to set information to specify a buyer or a seller of an article for sale which is purchased by using electronic commerce and to output information related to the article for sale as prints or signals through a network.

For example, it is possible to set an information to be gotten on purchase to specify a buyer or a seller of an article for sale (a personal computer or a scanner or an image processing software) and to send the set information to an image processing apparatus as a final output apparatus and to multiplex the information to a printed image by the image processing apparatus. The information to specify a buyer or a seller of an article for sale may be multiplexed to data to be sent through a network by using the digital watermark, except the printed image.

Figure 5:
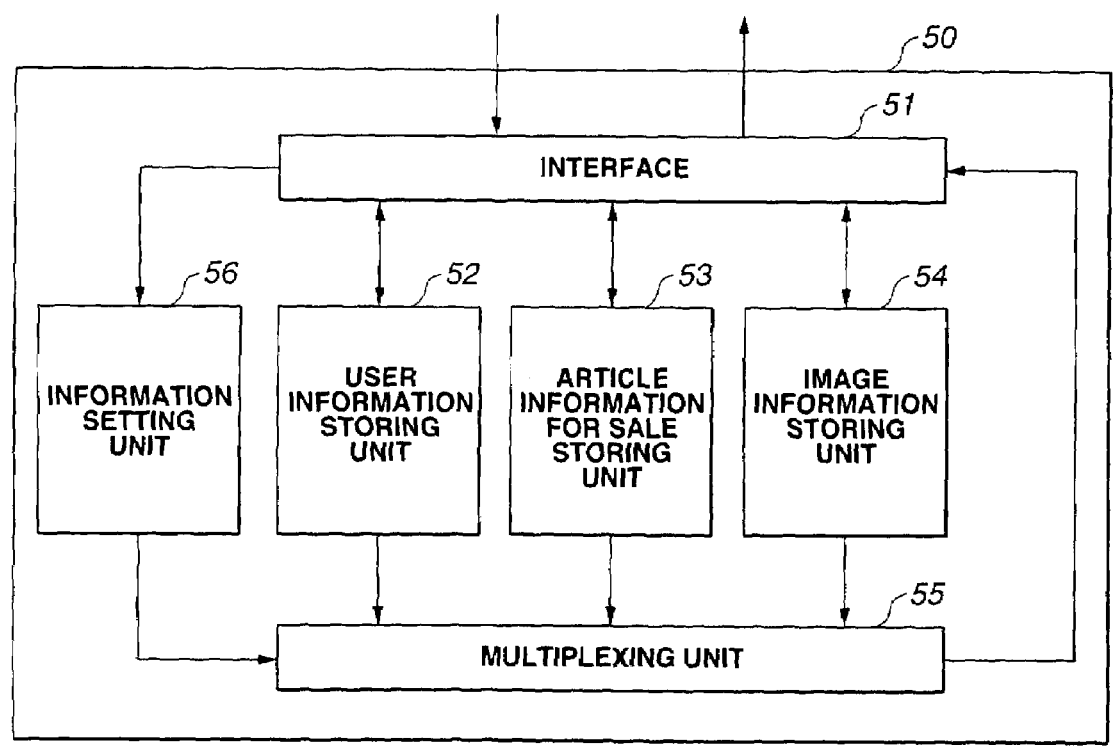
FIG. 5 is an example of structure that shows an image processing apparatus of the embodiments of the present invention.

FIG. 5 is an example of structure that shows an image processing apparatus of the embodiments of the present invention. Image processing apparatus 50 is a personal computer, a printer or a system including a personal computer and a printer. Interface 51 is a parallel interface, a serial interface like Universal serial bus, IEEE1394, or wireless interface. User information storing unit 52 is a random access memory, a hard disc ora detachable memory. Article information for sale storing unit 53 is random access memory, a hard disc, CD-ROM, memory card like compact flash. Image information storing unit 54 is random access memory, a hard disc, CD-ROM, memory card like compact flash. Multiplexing unit 55 is a printer controller forming a print image or a printer engine developing a print image. Information setting unit 56 is a central processor unit of image processing apparatus 50. The following processing is performed under control of the central processor unit.

Interface 51 is utilized for communicating image processing apparatus 50 to an external apparatus. User information storing unit 52 is a storing means for storing user information related to a buyer or a seller of the image processing apparatus 50. Article information for sale storing unit 53 is a storing means for storing information, input through a network, related to a buyer or a seller of an article of sale. Image information storing unit 54 stores printed image information. Information setting unit 56 sets predetermined information related a buyer or a seller of image processing apparatus 50, and multiplexing means 55 multiplexes the predetermined information to a printed image when the printing image is output.

The object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Further, the present invention includes a case where CPU equipped with an extender board or unit performs a part or entire processes in accordance with designations of the program codes after the program codes is stored on a memory connected the extender board or unit of a computer and realizes functions according to the above embodiments.

Further, according to the above-mentioned embodiment, since a purchased image processing apparatus can be set with information to specify a buyer or a seller of the purchased image processing apparatus by using user information related to electronic commerce, it is possible to get information to specify an owner from a forgery of bills or valuable securities. As a result, even though it is possible to perform an unlawful image processing by using the image processing apparatus, it is easy to identify an unlawful owner even in case the image processing apparatus has been thrown out.

Further, since information related to a buyer or a seller of an article of sale input through a network is multiplexed an output image, an unlawful process by using the article of sale obtained by electric commerce can be prohibited.

Although the invention has been described in its preferred form with a certain degree of particularity, it is understood that the present disclosure of the preferred form has been changed in the details of construction and the combination and the arrangement of parts may be resorted to without departing from the spirit and scope of the invention as hereinafter claimed.

What is claimed is:

1. An image processing apparatus comprising:
   user information storing means for storing user information of a seller or a buyer of the image processing apparatus; and
   multiplexing means for multiplexing the stored user information to an output image to be printed by the image processing apparatus so as to facilitate identification of the seller or the buyer of the image processing apparatus from the output image,
   wherein, said user information of the seller or buyer of the image processing apparatus is obtained and stored in the storing means when the image processing apparatus is sold through a network, and
   wherein said user information multiplexed to the output image is not visible in said output image.

2. An image processing apparatus according to claim 1, further comprising information setting means for setting predetermined information related to the seller or the buyer of the image processing apparatus,
   wherein the multiplexing means multiplexes the predetermined information to the output image.

3. An image processing apparatus according to claim 2, wherein the predetermined information is a public key certification.

4. An image processing apparatus according to claim 2, wherein the predetermined information is information to specify an objective use on a database.

5. An electronic commerce system which performs electronic commerce connecting one terminal with another terminal through a network, the system comprising:
   information setting means for setting, in an image processing apparatus, information of a seller or a buyer of the image processing apparatus, the information being obtained through the network; and
   multiplexing means for multiplexing said information of the seller or buyer of the image processing apparatus set by the information setting means to an output image to be printed by the image processing apparatus so as to facilitate identification of the seller or the buyer of the image processing apparatus from the output image,
   wherein said set information multiplexed to the output image is not visible in said output image.

6. An electronic commerce system according to claim 5, wherein the information set by the information setting means is a public key certification.

7. An electronic commerce system according to claim 5, wherein the information set by the setting means is information to specify an objective use on a database.

8. An image processing method, comprising the steps of:
   a user information storing step for storing, in an image processing apparatus, user information of a seller or a buyer of the image processing apparatus; and
   a multiplexing step for the image processing apparatus to multiplex the stored user information of the seller or buyer of the image processing apparatus to an output image to be printed by the image processing apparatus so as to facilitate identification of the seller or the buyer of the image processing apparatus from the output image,
   wherein said user information is obtained and stored in the storing step when the image processing apparatus is sold through a network, and
   wherein said user information multiplexed to the output image is not visible in said output image.

9. An image processing method according to claim 8, further comprising an information setting step for setting predetermined information related to the seller or the buyer of the image processing apparatus,
   wherein the multiplexing step multiplexes the predetermined information to the output image.

10. An image processing method according to claim 9, wherein the predetermined information is a public key certification.

11. An image processing method according to claim 9, wherein the predetermined information is information to specify an objective use on a database.

12. An electronic commerce method which performs electronic commerce connecting one terminal with another terminal through a network, the method comprising the steps of:
- an information setting step of setting, in an image processing apparatus, information of a seller or a buyer of the image processing apparatus, the information being obtained through the network; and
- a multiplexing step of the image processing apparatus multiplexing said information of the seller or buyer of the image processing apparatus set by the information setting step to an output image to be printed by the image processing apparatus so as to facilitate identification of the seller or the buyer of the image processing apparatus from the output image,
- wherein said user information multiplexed to the output image is not visible in said output image.

13. An electronic commerce method according to claim 12, wherein the information set in the information setting step is a public key certification.

14. An electronic commerce method according to claim 12, wherein the set information is information to specify an objective use on a database.

15. A computer program stored on a computer readable medium, the program for executing image processing on an image processing apparatus, said program comprising the steps of:
- a user information storing step of storing, in an image processing apparatus, user information of a seller or a buyer of the image processing apparatus; and
- a multiplexing step of multiplexing the stored user information of the seller or buyer of the image processing apparatus to an output image to be printed by the image processing apparatus so as to facilitate identification of the seller or the buyer of the image processing apparatus from the output image,
- wherein, said user information is obtained and stored in the storing step when the image processing apparatus is sold through a network, and
- wherein said user information multiplexed in the output image is not visible in said output image.

16. A computer program stored on a computer readable medium, the program for performing electronic commerce through a network system connecting one terminal with another terminal through a network, the computer program product comprising the steps of:
- an information setting step of setting, in an image processing apparatus, information of a seller or a buyer of the image processing apparatus, the information being obtained through the network; and
- a multiplexing step of multiplexing said information of the seller or buyer of the image processing apparatus set by the information setting means to an output image to be printed by the image processing apparatus so as to facilitate identification of the seller or the buyer of the image processing apparatus from the output image,
- wherein said user information multiplexed in the output image is not visible in said output image.

17. An image processing method for an image processing apparatus, comprising the steps of:
- a user information storing step of storing, in the image processing apparatus, user information of a seller or a buyer of the image processing apparatus; and
- a multiplexing step of the image processing apparatus multiplexing the stored user information of the seller or buyer of the information processing apparatus to an output image to be printed by the image processing apparatus so as to facilitate identification of the seller or the buyer of the image processing apparatus from the output image,
- wherein, the user information is obtained and stored in the storing step when the image processing apparatus is sold through a network, and
- wherein said user information multiplexed in the output image is not visible in said output image.

18. An image processing method according to claim 17, wherein the user information comprises a public key certification, an account number of the buyer, or credit card information of the buyer.

19. An image processing method according to claim 17, wherein the user information comprises information of the seller, information of a date of sale, or information of a store selling the image processing apparatus.

20. An image processing method according to claim 17, wherein the user information is stored when a driver of the image processing apparatus is downloaded or is installed.

21. An image processing method according to claim 17, wherein the multiplexing is performed by using a digital watermark.

22. An image processing method according to claim 17, wherein the digital watermark is added in a spatial area of the output image.

23. An image processing method according to claim 17, wherein the digital watermark is added in a frequency area of the output image.

24. An image processing method for a image processing apparatus, comprising the steps of:
- a user information receiving step for the image processing apparatus receiving user information of a seller or a buyer of an image processing product from the image processing product; and
- a multiplexing step for the image processing apparatus to multiplex the received user information of the seller or buyer of the information processing product to an output image to be printed by the image processing apparatus so as to facilitate identification of the seller or the buyer of the image processing apparatus from the output image,
- wherein, said user information is received by the image processing apparatus when the image processing product is sold through a network, and
- wherein said user information multiplexed in the output image is not visible in said output image.

25. An image processing method according to claim 24, wherein the user information comprises a public key certification, an account number of the buyer, or credit card information of the buyer.

26. An image processing method according to claim 24, wherein the user information comprises information of the seller, information of a date of sale, or information of a store selling the image processing apparatus.

27. An image processing method according to claim 24, wherein the user information is received when a driver of the image processing apparatus is downloaded or is installed.

28. An image processing method according to claim 24, wherein the multiplexing is performed by using a digital watermark.

29. An image processing method according to claim 24, wherein the digital watermark is added in a spatial area of the output image.

30. An image processing method according to claim 24, wherein the digital watermark is added in a frequency area of the output image.

31. An image processing method according to claim 24, wherein the image processing product comprises a personal computer, a scanner, or an image processing software.

32. An image processing apparatus comprising:
a memory storing user information of a seller or a buyer of the image processing apparatus; and
a controller multiplexing the stored user information of the seller or buyer of the information processing apparatus to an output image to be printed by the image processing apparatus so as to facilitate identification of the seller or the buyer of the image processing apparatus from the output image,
wherein, said user information is obtained and stored in the memory when the image processing apparatus is sold through a network, and
wherein said user information multiplexed in the output image is not visible in said output image.

33. An image processing apparatus according to claim 32, further comprising a processor setting predetermined information related to the seller or the buyer of the image processing apparatus,
wherein the controller multiplexes the predetermined information to the output image.

34. An image processing apparatus according to claim 33, wherein the predetermined information is a public key certification.

35. An image processing apparatus according to claim 33, wherein the predetermined information is information to specify an objective use on a database.

36. An electronic commerce system which performs electronic commerce connecting one terminal with another terminal through a network, the system comprising:
a processor setting, in an image processing apparatus, information of a seller or a buyer of the image processing apparatus, the information being obtained through the network; and
a controller multiplexing said information of the seller or buyer of the image processing apparatus set by the processor to an output image to be printed by the image processing apparatus so as to facilitate identification of the seller or the buyer of the image processing apparatus from the output image,
wherein said user information multiplexed in the output image is not visible in said output image.

37. An electronic commerce system according to claim 36, wherein the information set by the processor is a public key certification.

38. An electronic commerce system according to claim 36, wherein the set information is information to specify an objective use on a database.

39. An image processing method, comprising the steps of:
storing, in an image processing apparatus, user information of a seller or a buyer of the image processing apparatus; and
multiplexing the stored user information of the seller or buyer of the image processing apparatus to an output image to be printed by the image processing apparatus so as to facilitate identification of the seller or the buyer of the image processing apparatus from the output image,
wherein, said user information is obtained and stored in the storing step when the image processing apparatus is sold through a network, and
wherein said user information multiplexed in the output image is not visible in said output image.

40. An image processing method according to claim 39, further comprising setting predetermined information related to the seller or the buyer of the image processing apparatus,
wherein the predetermined information is multiplexed to the output image.

41. An image processing method according to claim 40, wherein the predetermined information is a public key certification.

42. An image processing method according to claim 40, wherein the predetermined information is information to specify an objective use on a database.

43. An electronic commerce method which performs electronic commerce connecting one terminal with another terminal through a network, the method comprising the steps of:
setting, in an image processing apparatus, information of a seller or a buyer of the image processing apparatus, the information being obtained through the network; and
multiplexing said information of the seller or buyer of the image processing apparatus set by the setting step to an output image to be printed by the image processing apparatus so as to facilitate identification of the seller or the buyer of the image processing apparatus from the output image,
wherein said user information multiplexed in the output image is not visible in said output image.

44. An electronic commerce method according to claim 43, wherein the set information is a public key certification.

45. An electronic commerce method according to claim 43, wherein the set information is information to specify an objective use on a database.

46. An image processing method for an image processing apparatus, comprising the steps of:
storing, in the image processing apparatus, user information of a seller or a buyer of the image processing apparatus; and
multiplexing the stored user information of the seller or buyer of the image processing apparatus to an output image to be printed by the image processing apparatus so as to facilitate identification of the seller or the buyer of the image processing apparatus from the output image,
wherein, said user information is obtained and stored in the storing step when the image processing apparatus is sold through a network, and
wherein said user information multiplexed in the output image is not visible in said output image.

47. An image processing method according to claim 46, wherein the user information comprises a public key certification, an account number of the buyer, or credit card information of the buyer.

48. An image processing method according to claim 46, wherein the user information comprises information of the seller, information of a date of sale, or information of a store selling the image processing apparatus.

49. An image processing method according to claim 46, wherein the user information is stored when a driver of the image processing apparatus is downloaded or is installed.

50. An image processing method according to claim 46, wherein the multiplexing is performed by using a digital watermark.

51. An image processing method according to claim 50, wherein the digital watermark is added in a spatial area of the output image.

52. An image processing method according to claim 50, wherein the digital watermark is added in a frequency area of the output image.

53. An image processing method for an image processing apparatus, comprising the steps of:
   receiving, by the image processing apparatus, user information of a seller or a buyer of an image processing product from the image processing product; and
   multiplexing the received user information of the seller or buyer of the information product to an output image to be printed by the image processing apparatus so as to facilitate identification of the seller or the buyer of the image processing apparatus from the output image,
   wherein, said user information is received when the image processing apparatus is sold through a network, and
   wherein said user information multiplexed in the output image is not visible in said output image.

54. An image processing method according to claim 53, wherein the user information comprises a public key certification, an account number of the buyer, or credit card information of the buyer.

55. An image processing method according to claim 53, wherein the user information comprises information of the seller, information of a date of sale, or information of a store selling the image processing apparatus.

56. An image processing method according to claim 53, wherein the user information is received when a driver of the image processing apparatus is downloaded or is installed.

57. An image processing method according to claim 53, wherein the multiplexing is performed by using a digital watermark.

58. An image processing method according to claim 57, wherein the digital watermark is added in a spatial area of the output image.

59. An image processing method according to claim 57, wherein the digital watermark is added in a frequency area of the output image.

60. An image processing method according to claim 57, wherein the image processing product comprises a personal computer, a scanner, or an image processing software.

* * * * *

UNITED STATES PATENT AND TRADEMARK OFFICE
CERTIFICATE OF CORRECTION

PATENT NO. : 7,146,339 B2
APPLICATION NO. : 09/781332
DATED : December 5, 2006
INVENTOR(S) : Iwamura It is certified that error appears in the above-identified patent and that said Letters Patent is hereby corrected as shown below:

Title page
Item (56) Other Publications, After "T. Nakamura,": "A" should read -- "A --; and "Image," should read -- Image", --.

After "H. Ishizuka,": "SCI'S 97-26D." should read -- SCIS'97-26D. --.

COLUMN 1:
Line 63, "multiplexed" should read -- multiplexed to --.

COLUMN 2:
Line 35, "unlawful," should read -- unlawfully, --.

COLUMN 3:
Line 22, "user" should read -- user that --;
Line 24, "owned" should read -- owned by --; and
Line 66, "used" should read -- used for --.

COLUMN 4:
Line 52, "purchased" should read -- already been purchased --; and
Line 54, "already" should read -- already been --.

COLUMN 5:
Line 16, "controlled a" should read -- a controlled --; and
Line 52, "added the" should read -- added --.

COLUMN 6:
Line 19, "Okla.," should read -- Oka., --; and
Line 58, "ora" should read -- or a --.

COLUMN 7:
Line 10, "related" should read -- related to --;
Line 39, "connected" should read -- connected to --; and
Line 53, "multiplexed" should read -- multiplexted to --.

UNITED STATES PATENT AND TRADEMARK OFFICE
CERTIFICATE OF CORRECTION

PATENT NO.        : 7,146,339 B2
APPLICATION NO.   : 09/781332
DATED             : December 5, 2006
INVENTOR(S)       : Iwamura It is certified that error appears in the above-identified patent and that said Letters Patent is hereby corrected as shown below:

COLUMN 10:
Line 38, "a" should read -- an --.

Signed and Sealed this

Thirteenth Day of November, 2007

JON W. DUDAS
*Director of the United States Patent and Trademark Office*